(12) United States Patent
Mattson et al.

(10) Patent No.: US 8,977,525 B2
(45) Date of Patent: Mar. 10, 2015

(54) NON-VARIATIONAL CHANGES IN A VARIATIONAL SYSTEM

(71) Applicant: Siemens Product Lifecycle Management Software Inc., Plano, TX (US)

(72) Inventors: Howard Charles Duncan Mattson, Cambridge (GB); Douglas Joseph King, Peterborough (GB); Paul Jonathon Sanders, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 373 days.

(21) Appl. No.: 13/627,074

(22) Filed: Sep. 26, 2012

(65) Prior Publication Data

US 2014/0012547 A1   Jan. 9, 2014

Related U.S. Application Data

(60) Provisional application No. 61/668,794, filed on Jul. 6, 2012.

(51) Int. Cl.
*G06F 17/50* (2006.01)
(52) U.S. Cl.
CPC .................................. *G06F 17/5086* (2013.01)
USPC .................................................... 703/2; 703/1
(58) Field of Classification Search
CPC .................................................... G06F 17/5086
USPC .......................................................... 703/1, 2
See application file for complete search history.

(56) References Cited

U.S. PATENT DOCUMENTS

| 8,463,581 B2 * | 6/2013 | Corcoran et al. ................. 703/1 |
| 2005/0154481 A1 * | 7/2005 | Berger et al. .................... 700/98 |
| 2008/0252663 A1 * | 10/2008 | Kripac et al. ................... 345/681 |
| 2011/0025688 A1 * | 2/2011 | Schneider et al. ............ 345/420 |
| 2011/0276315 A1 * | 11/2011 | Brookes et al. ................... 703/1 |

OTHER PUBLICATIONS

Meera Sitharam, Adam Arbree, Yong Zhou, "Solution space navigation for geometric constraint systems" ACM Transactions, Sep. 10, 2005; pp. 1-20.*
C. Hsu, G. Alt, Z. Huang, E. Beier, B. Bruderlin, "A Constraint-based Manipulator Toolset for Editing 3D Objects" 1997 ACM pp. 168-180.*

* cited by examiner

*Primary Examiner* — Dwin M Craig

(57) ABSTRACT

Methods for product data management and corresponding systems and computer-readable mediums. A method includes receiving a three-dimensional CAD model in the data processing system, the CAD model including a plurality of features. The method includes receiving a selection of a non-variational function to be applied to the CAD model, including a selection of at least one feature to which the function is to be applied. The method includes creating a copy of the selected feature as a second body to produce a modified feature and adding the modified feature to a solver configuration of the CAD model. The method includes solving the CAD model according to the solver configuration to produce a modified CAD model, and storing the modified CAD model.

20 Claims, 13 Drawing Sheets

NON-VARIATIONAL CHANGES IN A VARIATIONAL SYSTEM

CROSS-REFERENCE TO OTHER APPLICATIONS

This application claims the benefit of the filing data of U.S. Provisional Patent Application 61/668,794, filed Jul. 6, 2012, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for product data management, corresponding systems, and computer-readable mediums. A method includes receiving a three-dimensional CAD model in the data processing system, the CAD model including a plurality of features. The method includes receiving a selection of a non-variational function to be applied to the CAD model, including a selection of at least one feature to which the function is to be applied. The method includes creating a copy of the selected feature as a second body to produce a modified feature and adding the modified feature to a solver configuration of the CAD model. The method includes solving the CAD model according to the solver configuration to produce a modified CAD model, and storing the modified CAD model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Within a variational modeling system, such as the "Synchronous Technology" processes used in Siemens Product Lifecycle Management Software, Inc. products, changes are generally expressed variationally. A variational system describes the parameters of and relationships between features in an object model in terms of geometric constraints and dimensions. Such systems then use a "solver" process to process these constraints and dimensions, along with a multitude of ancillary constraints and dimensions required to maintain design intent, and the entire model is solved simultaneously.

Some changes, however, are not directly expressible variationally in that they cannot be expressed in terms of geometric constraints and dimensions. Such non-variational changes cannot be directly handled by such current systems. The techniques described herein include systems and methods that allow such changes to be handled.

Figure 1:
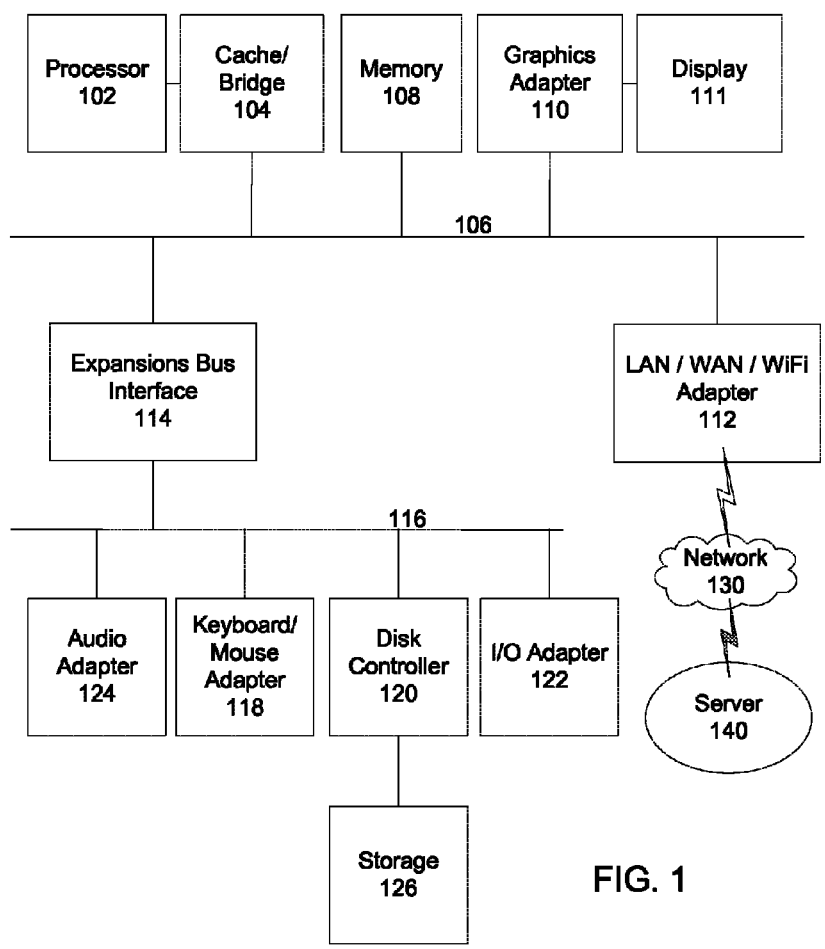
FIG. 1 depicts a block diagram of a data processing system in which an embodiment can be implemented.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include systems and methods that can handle both variational and non-variational edits to an object model, such as a three-dimensional (3D) model in a CAD system.

Figure 2A:
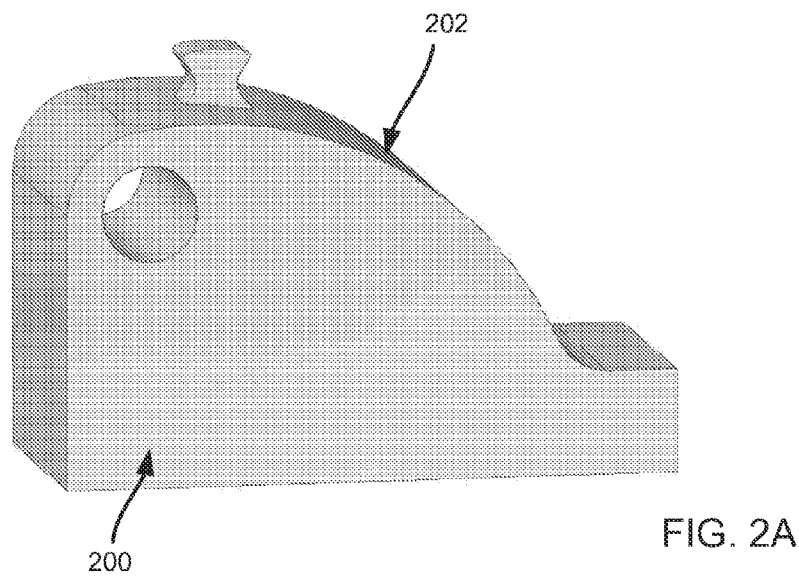
FIGS. 2A-2L illustrate edits to a CAD model and related considerations, in accordance with disclosed embodiments.

FIG. 2A depicts an example of a variational change to a 3D model 200. Model 200 is a B-rep model and has a face 202 with a cylindrical surface. While FIG. 2A is shown in a 3D perspective view, the following figures are shown in edge-on side views of the same exemplary model 200, for clarity.

In this example, the face 202 is to be offset.

Figure 2B:
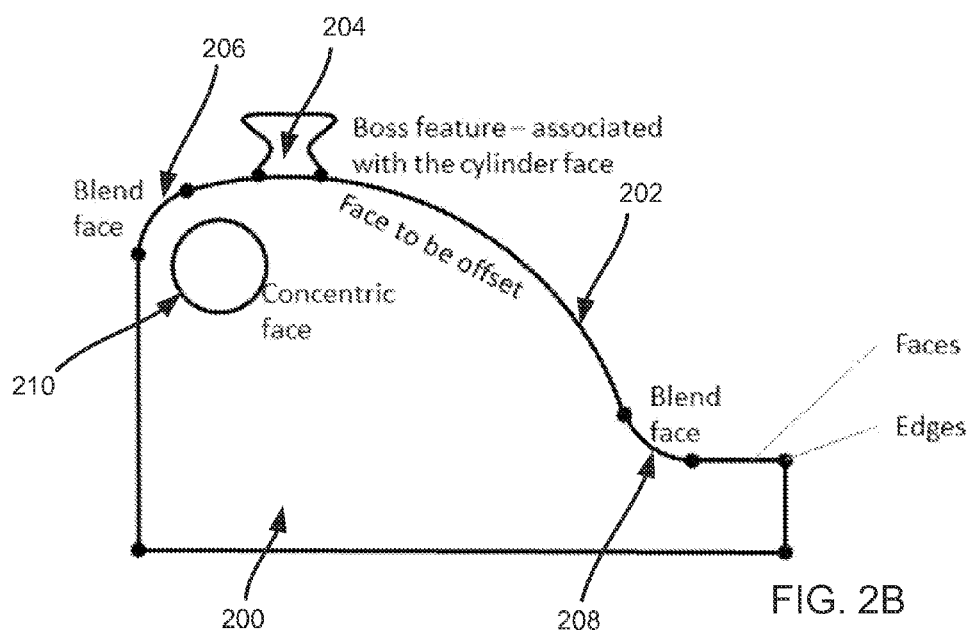

FIG. 2B illustrates various features of the model 200, including the face 202, a boss feature 204 associated with face 202, blend faces 206 and 208, and a concentric face 210, concentric with blend face 206. In these exemplary figures, lines represent faces, and the dot connections between faces represent edges.

Figure 2C:
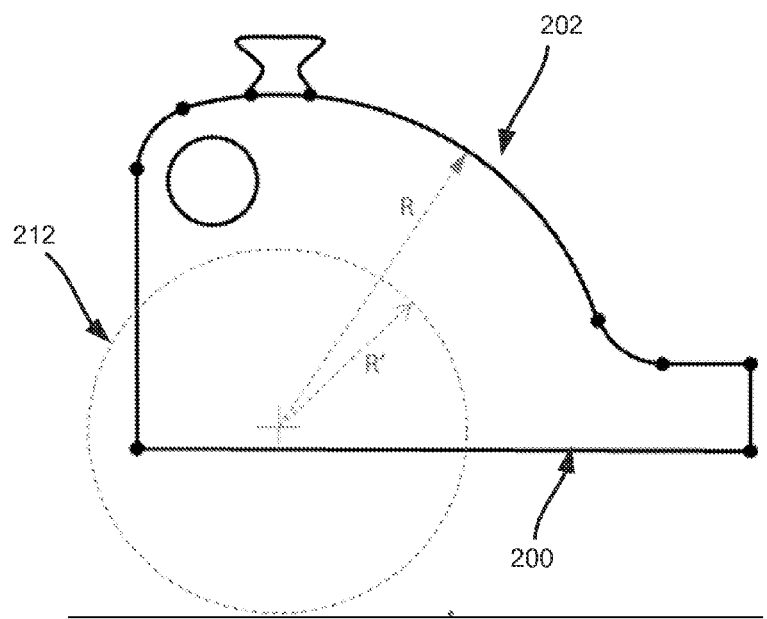

FIG. 2C illustrates that offsetting this cylindrical face can be represented to the solver as a radius change of the circle 212 that defines the cylindrical face 202, changing from radius R to radius R'.

Figure 2D:
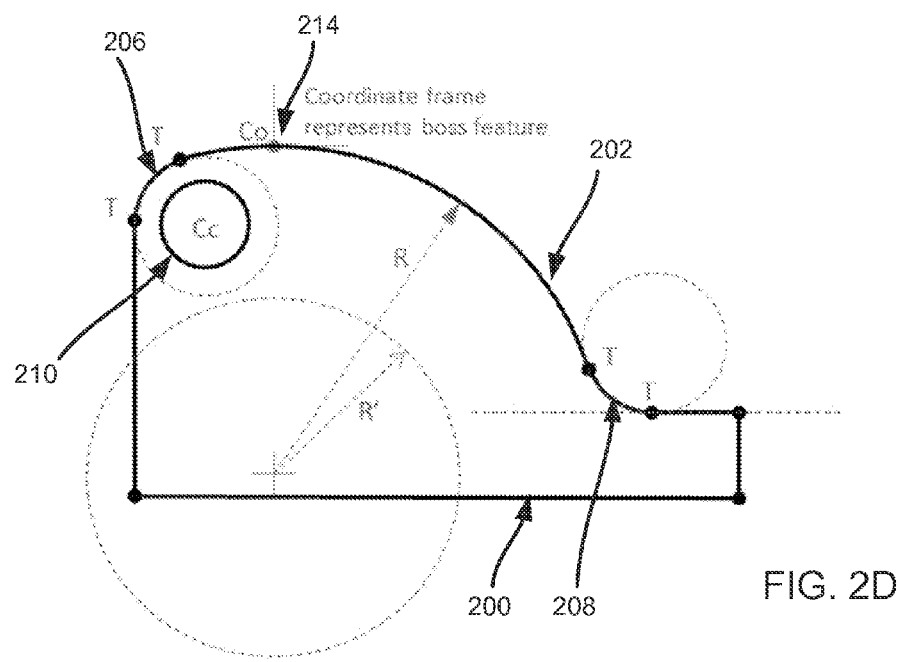

FIG. 2D illustrates the ancillary constraints and dimensions are then added. In this case the blends 206 and 208 need to be maintained relative to the changing face 202 so are added and constrained tangent (T). The concentric face 210 is then required and is constrained concentric (Cc) and the boss feature 204 (of FIG. 2B) which is required to stay on the changing surface is represented by a coordinate system 214 and constrained coincident (Co).

Figure 2E:
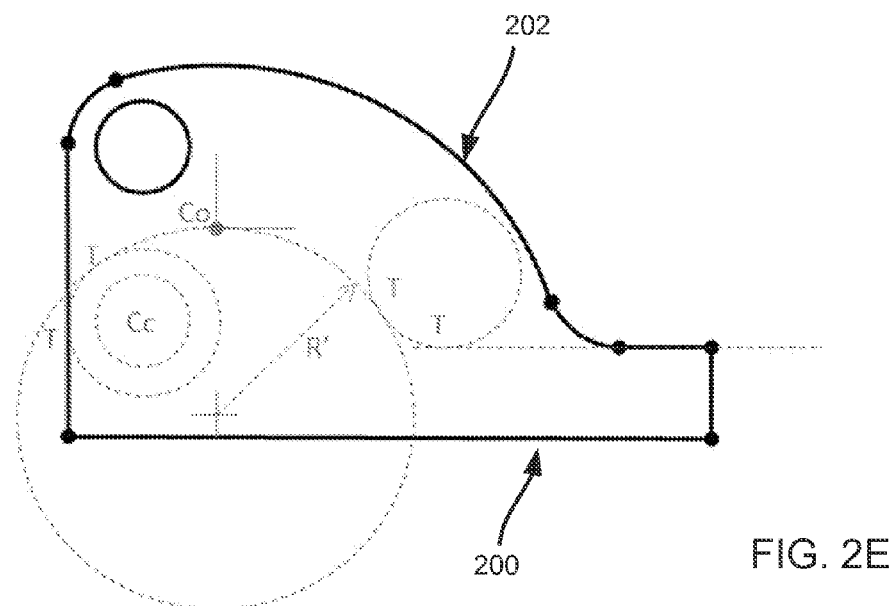

FIG. 2E illustrates the system solving the radius change and all the other constraints simultaneously, giving new size and position for surface 202 and all of the underlying surfaces.

Figure 2F:
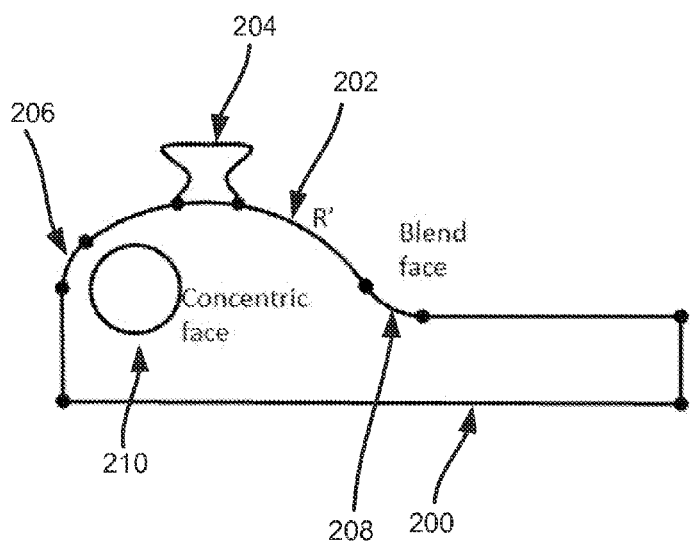
Figure 2G:
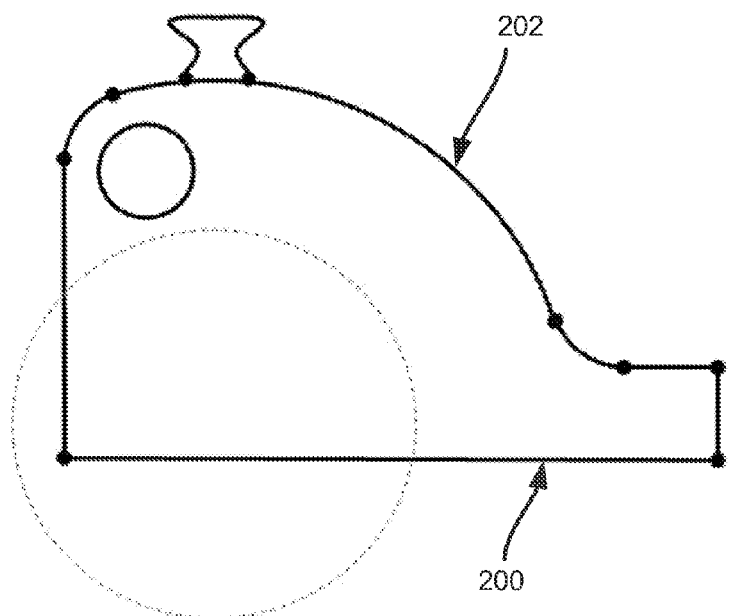

FIG. 2F illustrates the new surface geometry as incorporated into the B-rep model 200 with neighboring faces trimmed or extended as necessary to produce a valid result with the blends 206 and 208 maintained tangent, the concentric face 210 maintained concentric to blend 206 and the boss feature 204 replaced in the correct location provided by the coordinate system.

It is important to note two requirements that contributed to the successful result and if absent would likely cause an unsatisfactory result.

Requirement one is that the incorporation of all the new geometry into the model was performed at the same time. By way of illustration, if the offset of the cylindrical face 202 of model 200 shown in FIG. 2G were performed first in isolation of any ancillary geometry, then many other features would be effectively eliminated.

Figure 2H:
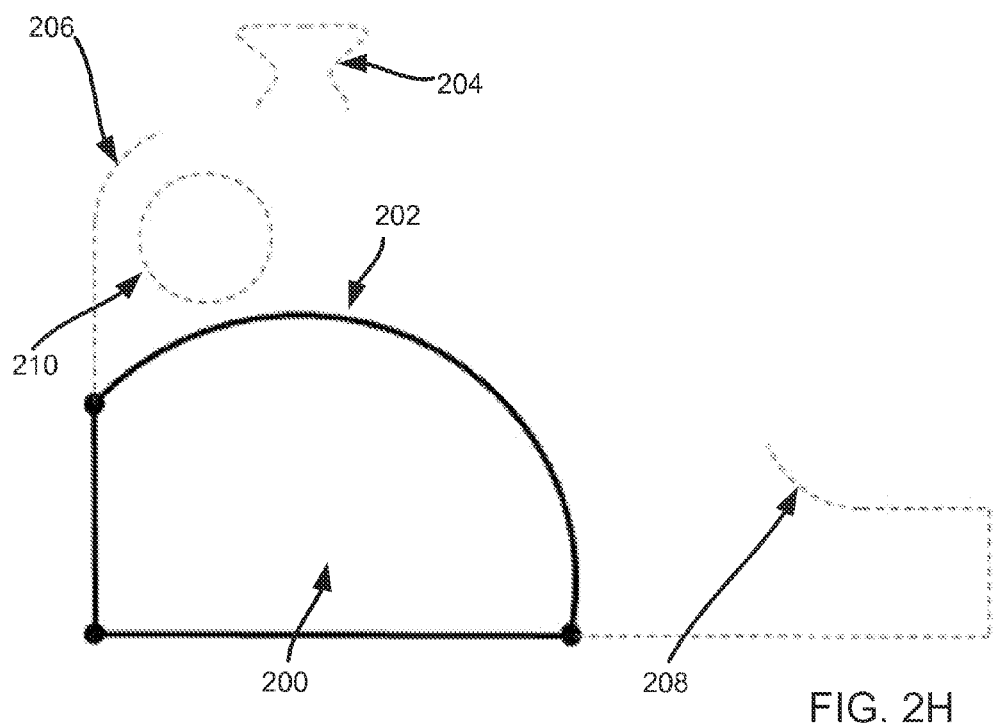
Figure 2I:
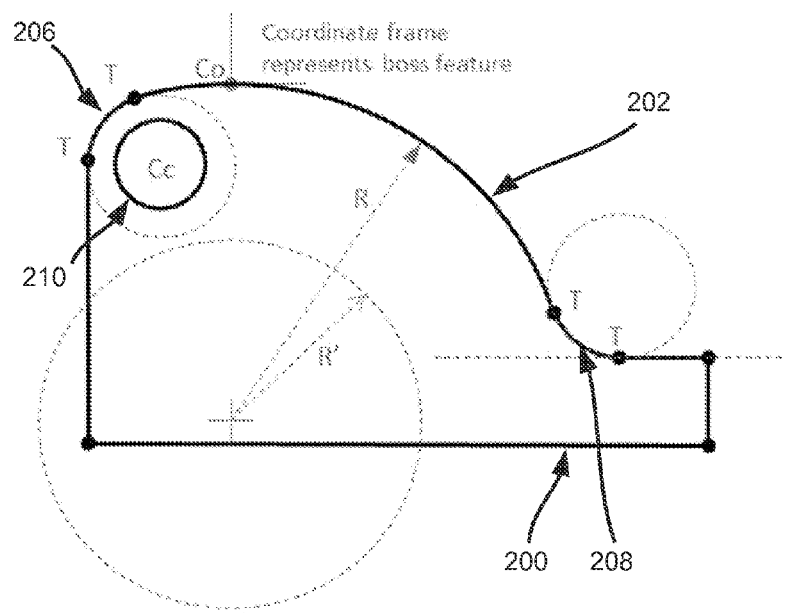

FIG. 2H illustrates that, in this example, the modification of the B-rep face 202 by offsetting would produce a consistent result as shown in model 200, but missing much of the detail, as illustrated by the dotted lines at deleted details including boss feature 204, concentric face 210, blends 206 and 208, etc. This is clearly unsatisfactory.

Requirement two is that the geometry should be solved such that the 'chirality' from the original model is preserved. By way of illustration, FIG. 2I above shows the new radius of the cylindrical face 202 of model 200, but where the ancillary geometry has not yet been solved. Notice the small cylinders 206 and 210 on the left are inside the original radius of cylinder 202.

Figure 2J:
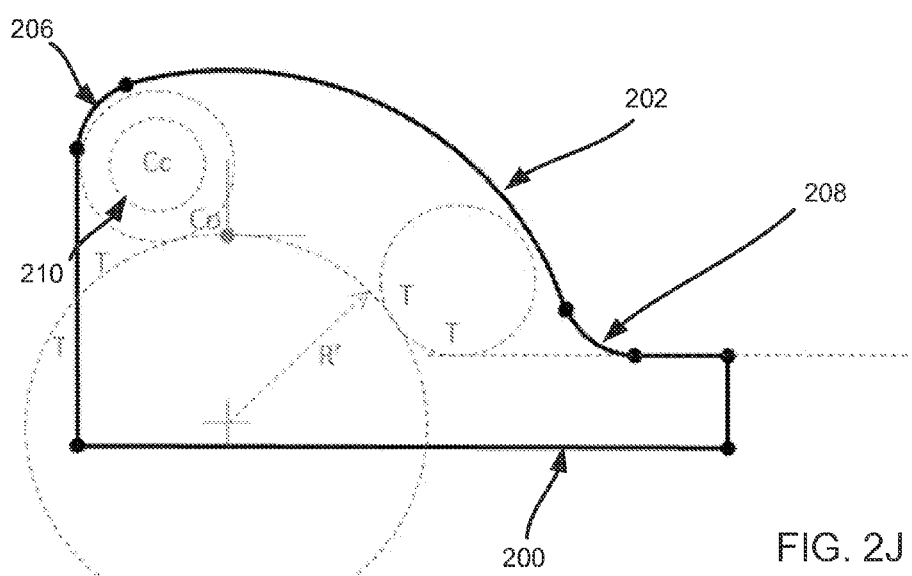

FIG. 2J illustrates the case where the ancillary geometry is solved without regard to the original cylinder and chirality. Notice the small cylinders 206 and 210 on the left are now outside the new radius of cylinder 202 thus violating requirement two.

Figure 2K:
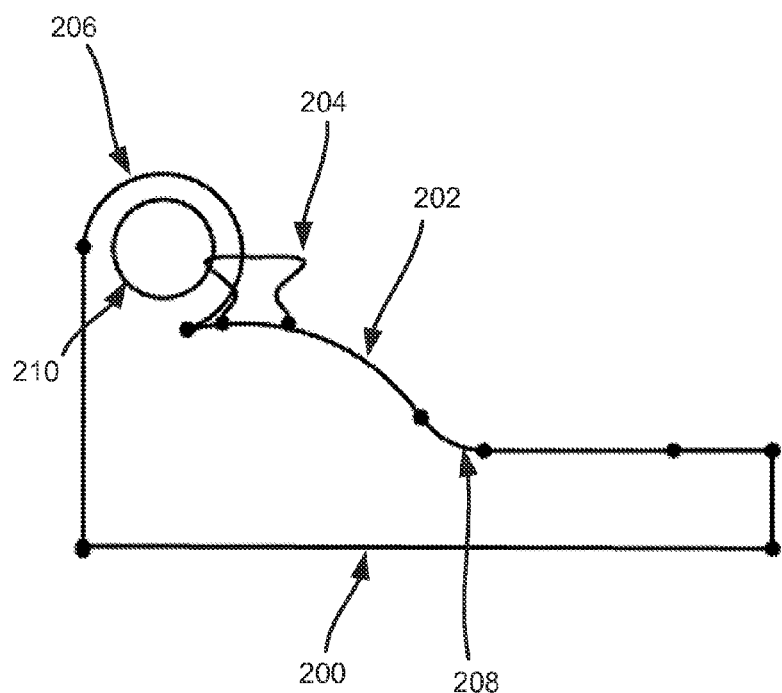
Figure 2L:
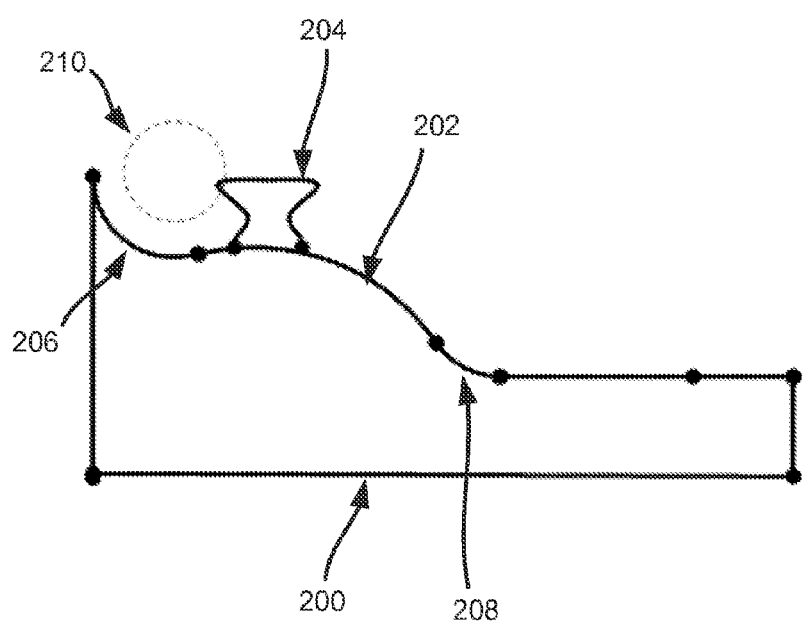

FIGS. 2K and 2L illustrate the unsatisfactory results that can be produced by violating requirement two.

So requirements one and two are necessary for acceptable results.

Disclosed embodiments address the case where a change that cannot be expressed variationally (in terms of geometric constraints and dimensions), referred to herein as a "non-variational change" or a "non-variational function." There are many examples of this; for purposes of illustration, a generic form is described herein which maps an original face F into a new face F' by the expression F'=B(F) where B is a generic "black box" function.

Figure 3A:
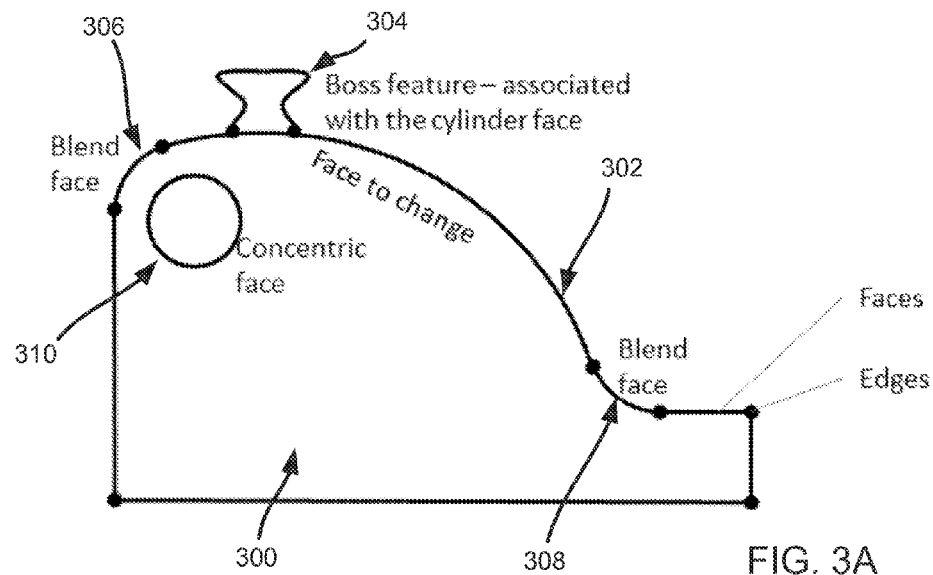
FIGS. 3A-3J illustrate a process for performing a non-variational change in a variational CAD model, in accordance with disclosed embodiments.

FIG. 3A shows a model 300 similar to that of the original case shown in FIG. 2B, including the face 302, a boss feature 304 associated with face 302, blend faces 306 and 308, and a concentric face 310, concentric with blend face 306.

Figure 3B:
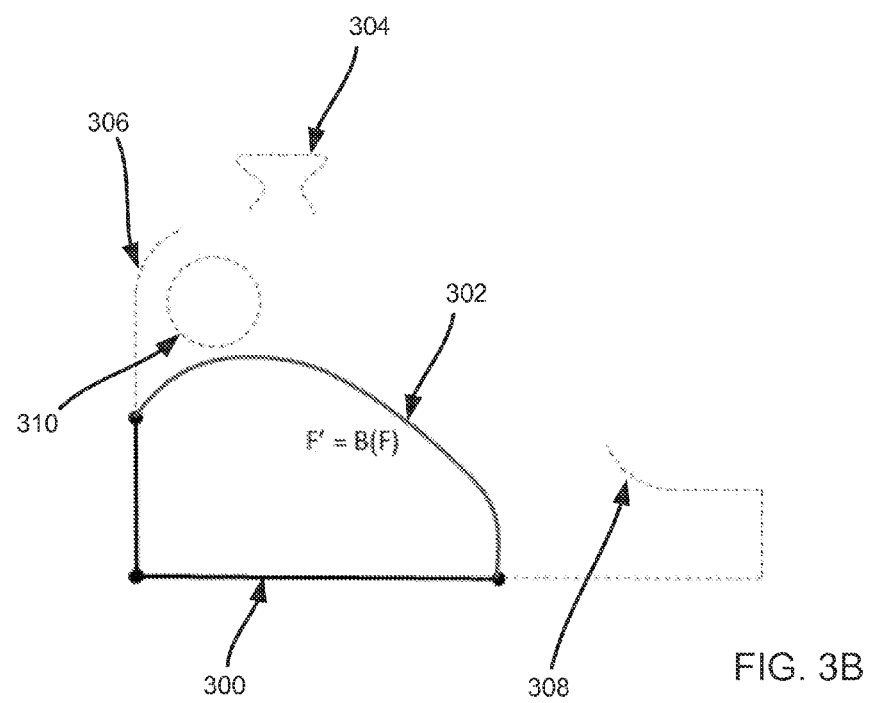

Applying the function B directly to the cylindrical face, results in possible failure of the function or else an unsatisfactory result, such as that depicted in FIG. 3B.

Disclosed embodiments can conform to requirements one and two during application of such a black box function.

Figure 4:
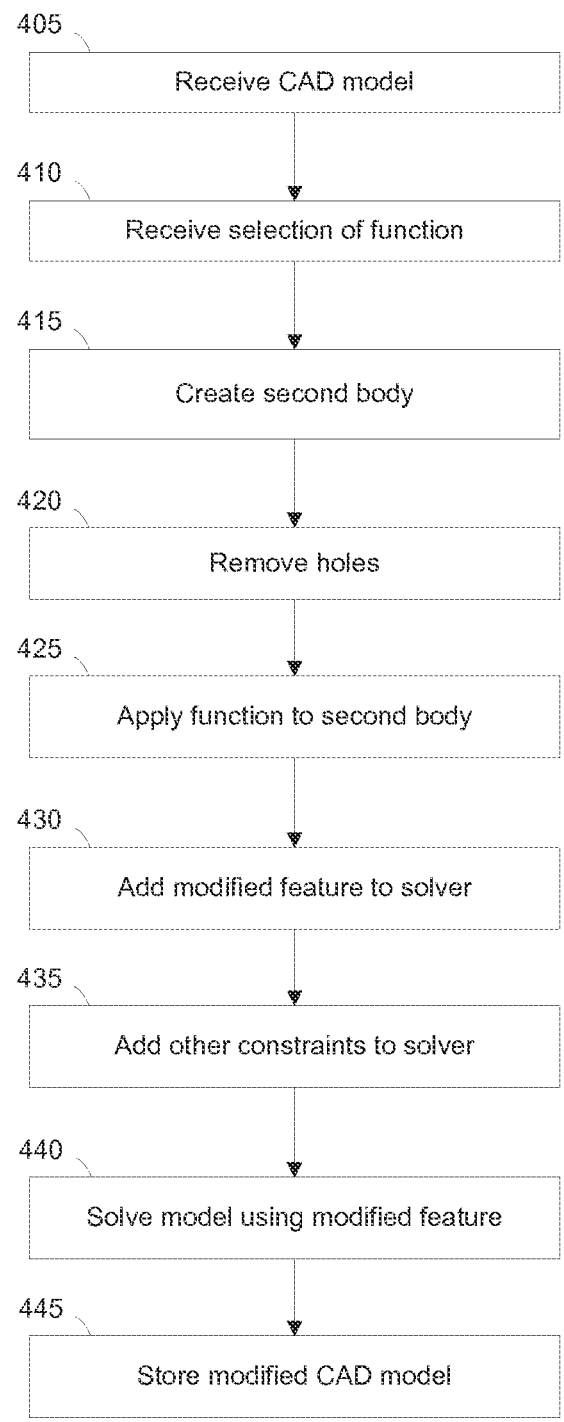
FIG. 4 depicts a flowchart of a process in accordance with disclosed embodiments.

FIG. 4 depicts a flowchart of a process in accordance with disclosed embodiments, as can be performed by one or more configured data processing systems 100.

The system receives a CAD model (step 405). The CAD model includes a plurality of features and can include a plurality of constraints between the features. Receiving, as used herein, can include loading from storage, receiving from another device or process, receiving via an interaction with a user, and otherwise.

The system receives a selection of a non-variational function to be applied to the CAD model (step 410). This can include receiving a selection of the function itself, and can include receiving a selection of one or more features of the CAD model to which the function is to be applied. The exemplary description below describes a face to be changed in the context of the example above, but the process applies to any feature of any CAD model. Each feature can be a face, edge, blend, hole, complex feature, or other part of the CAD model. The function can be an offset, taper, move, rotate, transform, resize, or other function that changes the placement, orientation, or other characteristics of the one or more features. The function can also be something as simple as a user moving the feature to a different position, for example.

Figure 3C:
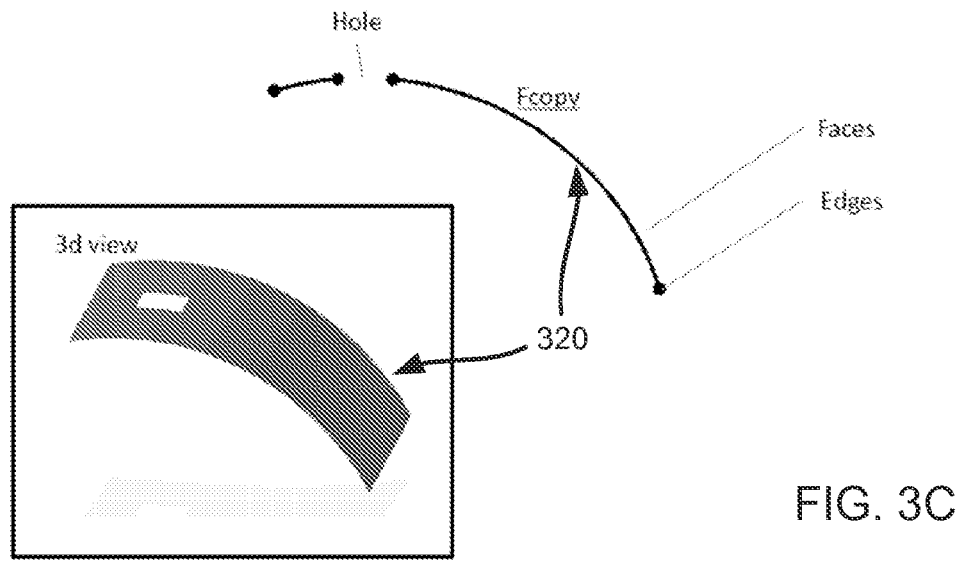

The system creates a copy of the feature to be changed as a second, separate body (step 415). In this example, the second body has just one face, Fcopy (the copy of the original face 302), and so is not a solid and often called a sheet body. FIG. 3C illustrates two-dimensional (2D) and 3D views of the second body 320.

Figure 3D:
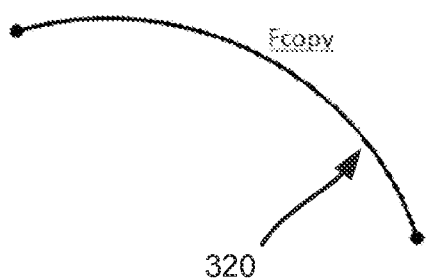

The system can remove any holes in the second body (step 420). FIG. 3D shows the second body 320 with the hole removed.

Isolating the face in a separate body and removing the holes serve to remove barriers to the success of the function B, which may be slowed down or otherwise hindered by the presence of static neighboring faces. This would be an example of a common problem in CAD modeling, where an intermediate state produces a problem which would not be present in the final desired state, yet prohibits progress to that final state. Reducing to a simple sheet at this stage vastly reduces the likelihood of this problem arising.

Figure 3E:
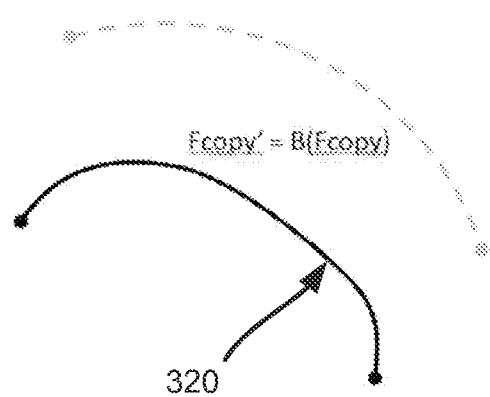

The system applies the function to this second body to produce a modified feature (step 425). In this example, the function B is applied to face Fcopy on the sheet body 320. FIG. 3E shows the modified feature, face Fcopy' of the second body 320, after the application of function B; the dotted line illustrates the original shape of face Fcopy.

Figure 3F:
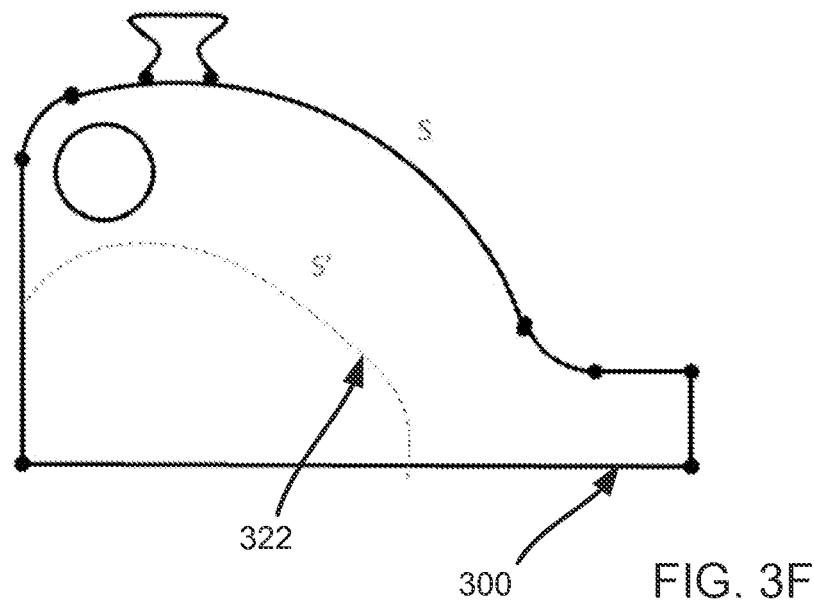

The system adds the modified feature to the solver configuration of the original CAD model (step 430). This step can include extracting the modified feature from the second body and adding it to the solver configuration for the original CAD model. FIG. 3F illustrates the modified feature S' 322 in conjunction with the original CAD model 300.

Figure 3G:
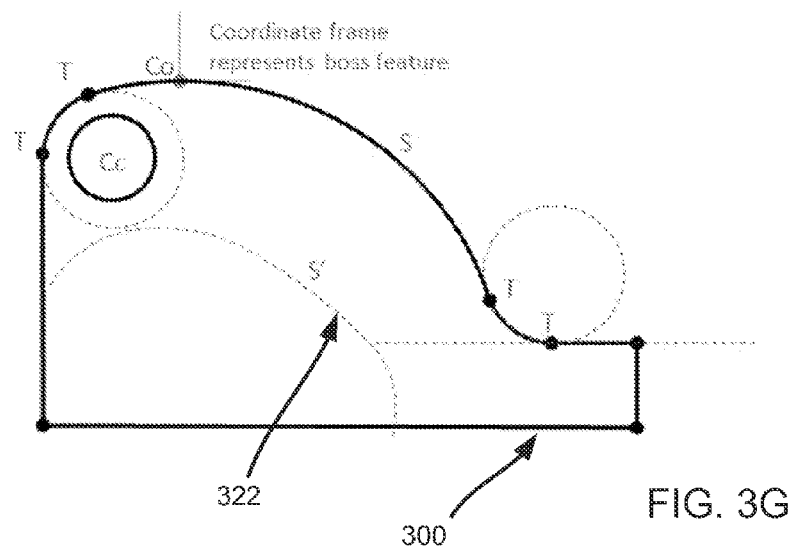

The system adds any ancillary constraints to the solver configuration of the original model (step 435), as for the variational change described earlier. FIG. 3G illustrates the modified feature S' 322 in conjunction with the original CAD model 300, and the other constraints as described above with relation to FIGS. 2A-2K.

The system solves the CAD model using modified feature and any ancillary constraints to produce a modified CAD model (step 440). The solve process can simultaneously solve the input modified feature, such as new surface S' 322 and the ancillary constraints. The process thus fulfills requirement one for a satisfactory solution and avoids undesirable results as discussed and illustrated above.

Requirement two is to maintain the chirality from the original, so as to avoid undesirable results as discussed and illustrated above. To do this, the chirality needs to be measured in the original model and specified to the solver, using techniques known to those of skill in the art. This may be done automatically by a solver offering this capability or else by the calling code. In this example, the chirality that applies to the tangency between the change face and the left hand blend is critical. The red blend cylinder must remain 'under' the changing surface as it changes from cylinder S to S'.

Figure 3H:
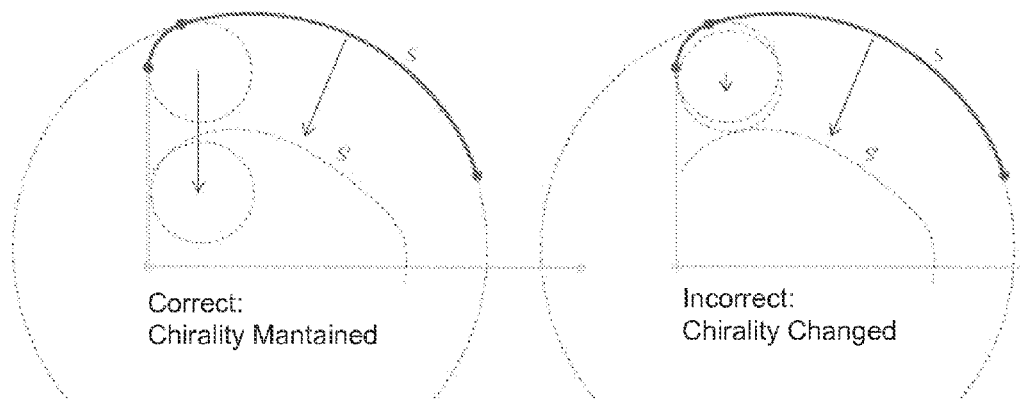
Figure 3I:
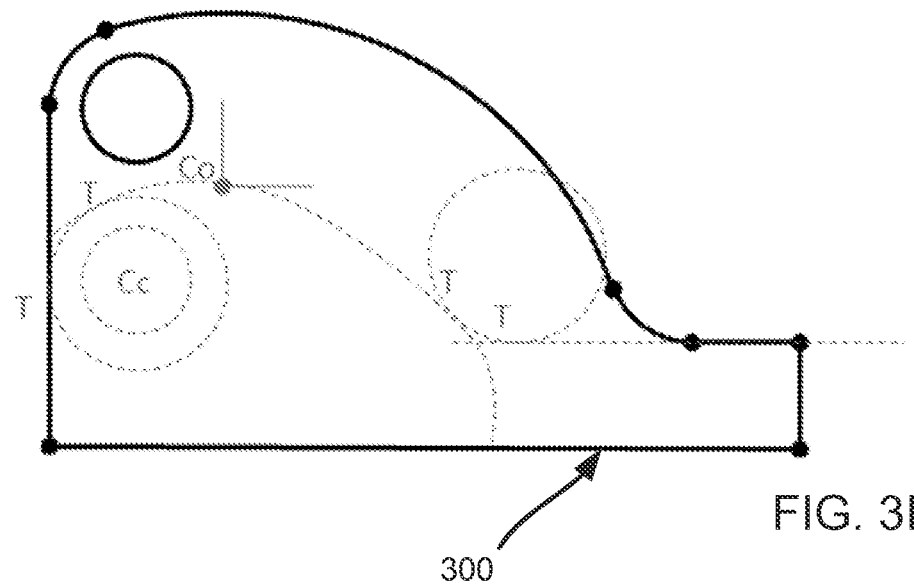

FIG. 3H illustrates correct and incorrect chirality processing in the context of the CAD model 300. FIG. 3I shows the constraints and modified feature as applied to the CAD model 300, with chirality maintained.

Figure 3J:
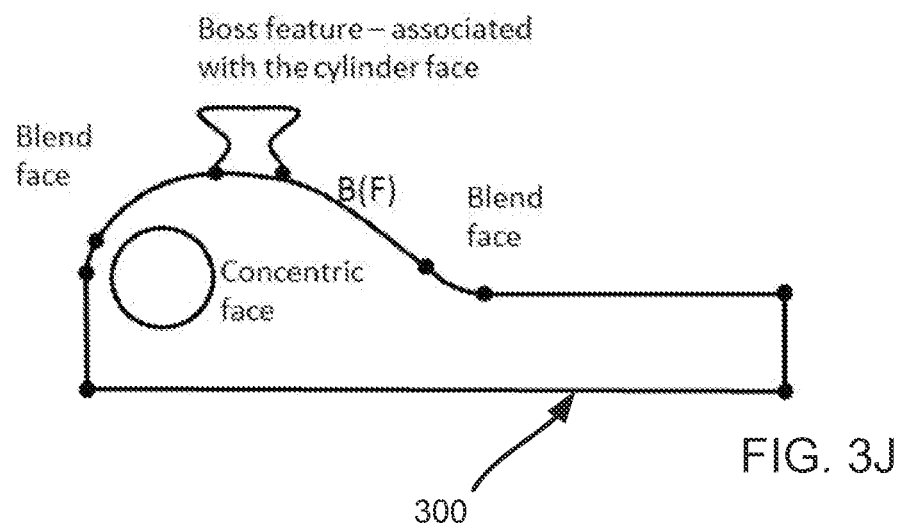

FIG. 3J shows CAD model 300 as modified, now the modified CAD model, after solving all the geometry at the same time and preserving the original chirality. The new geometry shape and position is incorporated into the B-rep model 300, trimming or extending neighbor faces as required.

The system stores or displays the modified CAD model (step 445), and can thereafter perform any further processing or editing as required.

The process described above performs a non-variational change specified by the generic function in a variational model to produce the correct result.

Of course, those of skill in the art will recognize that, unless specifically indicated or required by the sequence of operations, certain steps in the processes described above may be omitted, performed concurrently or sequentially, or performed in a different order. Any of the other features and processes described above can be included in the process of FIG. 4.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by a data processing system and comprising:
   receiving a three-dimensional CAD model in the data processing system, the CAD model including a plurality of features;
   receiving a selection of a non-variational function to be applied to the CAD model, including a selection of at least one feature to which the function is to be applied;
   creating a copy of the selected feature as a second body to produce a modified feature;
   adding the modified feature to a solver configuration of the CAD model;
   solving the CAD model according to the solver configuration to produce a modified CAD model; and
   storing the modified CAD model.

2. The method of claim 1, wherein the data processing system also removes any holes in the second body.

3. The method of claim 1, wherein the data processing system also adds ancillary constraints of the CAD model to the solver configuration.

4. The method of claim 1, wherein both non-variational and variational changes are made as part of the solve process.

5. The method of claim 1, wherein details and chirality of the CAD model are preserved in the solve process.

6. The method of claim 1, wherein the solve process simultaneously solves the modified feature and a plurality of other constraints of the CAD model.

7. The method of claim 1, wherein the selected function is one of an offset, move, rotate, transform, or resize function.

8. A data processing system comprising:
   a processor; and
   an accessible memory, the data processing system particularly configured to
      receive a three-dimensional CAD model in the data processing system, the CAD model including a plurality of features;
      receive a selection of a non-variational function to be applied to the CAD model, including a selection of at least one feature to which the function is to be applied;
      create a copy of the selected feature as a second body to produce a modified feature;
      add the modified feature to a solver configuration of the CAD model;
      solve the CAD model according to the solver configuration to produce a modified CAD model; and
      store the modified CAD model.

9. The data processing system of claim 8, wherein the data processing system also removes any holes in the second body.

10. The data processing system of claim 8, wherein the data processing system also adds ancillary constraints of the CAD model to the solver configuration.

11. The data processing system of claim 8, wherein both non-variational and variational changes are made as part of the solve process.

12. The data processing system of claim 8, wherein details and chirality of the CAD model are preserved in the solve process.

13. The data processing system of claim 8, wherein the solve process simultaneously solves the modified feature and a plurality of other constraints of the CAD model.

14. The data processing system of claim 8, wherein the selected function is one of an offset, move, rotate, transform, or resize function.

15. A non-transitory computer-readable medium encoded with executable instructions that, when executed, cause one or more data processing systems to:
   receive a three-dimensional CAD model in the data processing system, the CAD model including a plurality of features;
   receive a selection of a non-variational function to be applied to the CAD model, including a selection of at least one feature to which the function is to be applied;
   create a copy of the selected feature as a second body to produce a modified feature;
   add the modified feature to a solver configuration of the CAD model;
   solve the CAD model according to the solver configuration to produce a modified CAD model; and
   store the modified CAD model.

16. The computer-readable medium of claim 15, wherein the data processing system also removes any holes in the second body.

17. The computer-readable medium of claim 15, wherein the data processing system also adds ancillary constraints of the CAD model to the solver configuration.

18. The computer-readable medium of claim 15, wherein both non-variational and variational changes are made as part of the solve process.

19. The computer-readable medium of claim 15, wherein details and chirality of the CAD model are preserved in the solve process.

20. The computer-readable medium of claim 15, wherein the solve process simultaneously solves the modified feature and a plurality of other constraints of the CAD model.

* * * * *